United States Patent
Crawford et al.

(10) Patent No.: US 6,627,132 B1
(45) Date of Patent: Sep. 30, 2003

(54) METHOD OF MAKING A PLANT CONTAINER

(75) Inventors: Mark Allen Crawford, Valdosta, GA (US); Hamid Ullah, Hahira, GA (US)

(73) Assignee: Griffin Corporation, Valdosta, GA (US)

( * ) Notice: Subject to any disclaimer, the term of this patent is extended or adjusted under 35 U.S.C. 154(b) by 419 days.

(21) Appl. No.: 09/613,317

(22) Filed: Jul. 11, 2000

Related U.S. Application Data

(63) Continuation of application No. 08/702,028, filed on Aug. 23, 1996, now abandoned.

(51) Int. Cl.⁷ ............................................. B29C 54/14
(52) U.S. Cl. .................... 264/134; 264/510; 264/553; 264/322
(58) Field of Search ................................ 264/134, 510, 264/553, 554, 322; 524/457, 832, 413, 431, 425; 47/73, 77; 427/350, 375, 385.5, 393.5

(56) References Cited

U.S. PATENT DOCUMENTS

| | | | | |
|---|---|---|---|---|
| 2,848,842 A | * | 8/1958 | Tennant, Jr. | ............... 47/34 |
| 4,127,633 A | * | 11/1978 | Addleman | ............... 264/97 |
| 5,525,272 A | * | 6/1996 | Dugdale | ............... 264/134 |
| 5,557,886 A | * | 9/1996 | Whitcomb | ............... 47/73 |

FOREIGN PATENT DOCUMENTS

WO    WO 94/03057    *    2/1994

* cited by examiner

*Primary Examiner*—Edmund H. Lee
(74) *Attorney, Agent, or Firm*—Kilpatrick Stockton LLP

(57) ABSTRACT

A composition and method for forming plant containers, such as plant propagation trays providing control of plant root growth. The method includes applying to a sheet of thermoformable plastic an aqueous coating composition including between approximately 20% and 45% by weight non-delaminating acrylic latex, between approximately 8% and 30% by weight copper hydroxide, between approximately 2% and 20% by weight filler, and between approximately 0.5% and 5% by weight dispersant. The coating is dried and the plastic sheet is heated to a temperature sufficient to form the plastic. The plastic sheet is then formed into a desired shape.

16 Claims, No Drawings

METHOD OF MAKING A PLANT CONTAINER

This application is a continuation of U.S. applications Ser. No. 08/702,028, filed Aug. 23, 1996, now abandoned.

FIELD OF INVENTION

This invention relates to the control of plant root growth and to an improved material from which a plant container can be made, and, more particularly, relates to an improved container for plant propagation or transplantation which includes a copper-containing compound to control plant root growth for ease of extraction of the plant from the plant container. The present invention also relates to a method of making a thermoformed plant container which includes a copper-containing compound to control plant root growth.

BACKGROUND OF THE INVENTION

Cultivated plants are often propagated by initially germinating seeds or rooting cuttings at one site and then transplanting the seedlings or transplants to another site. For example, plants can be initially grown at a nursery and then transplanted by the customer to a permanent site. However, transplanting can be harmful to a plant. One problem with transplanting is that the plant root system can be damaged when the plant is removed from the initial site. Plants with damaged root systems often undergo transplant shock which can slow plant growth, and, in some instances, kill the plant. To reduce transplant shock, plants are initially grown in containers and then transplanted. Removing a plant from its container is less likely to damage the plant's root system than digging the plant out of the ground. A variety of plants, trees, shrubs, and the like, are initially grown in containers and then transplanted. However, transplanting plants from containers still presents some problems. One problem occurs when plants such as vegetables are grown in containers placed close to one another. The root growth of each plant can extend beyond its container and become entangled with the roots of adjacent plants. When the containers are separated and the plants are removed from the containers for transplanting, the root systems are damaged and the plants can undergo transplant shock. Another problem with plants grown in containers is that the container prevents the root system of the plant from growing in a natural pattern. In a natural environment, plant root systems extend relatively far away from the plant in the lateral and vertical directions for plant stability and maximum nutritional intake. In a container, the area of growth of the root system is limited and the roots are forced to turn at the container walls and grow into a tangled root ball which takes the shape of the container.

To control root growth in a plant container, chemical root pruning has been used. Chemical root pruning involves the use of chemicals, such as copper compounds, to stop root growth. For example, a mixture of conventional latex house paint and copper carbonate or copper hydroxide effectively controls root growth when used to coat the interior of a plant container. The copper$^{+2}$ ions in the latex paint are adsorbed by the roots as the roots approach the sides of the container and stop the growth of the roots. The root systems then branch behind the point of root growth inhibition. The plant root systems so treated tend to maintain a more natural growth pattern although the growth of the root system is foreshortened. When the plants are transplanted, the root systems resume normal growth. Furthermore, woody plant cuttings rooted in coated containers will form significantly more roots from the stem of the cutting. This effect improves plant growth and stability when removed from the treated container and grown to larger size.

Containers for plants, such as plant propagation trays or flower pots, are typically formed by molding a sheet of thermoformable material, such as a thermoplastic, for example, polystyrene, polyethylene or polypropylene. In the molding process, a mold release compound is usually applied to the plastic sheet in order to allow the molded material to release from the mold die. Such mold release compositions are usually silicon or wax based. Although such mold release compositions aid in mold release, they make applying a copper-containing coating composition to a formed plant container difficult, if not impossible.

The previously known copper-containing coatings for plant containers have been applied to the interior of the container after the plant container has been formed. Application of these coatings to formed plant containers is difficult, expensive and labor intensive. Furthermore, adhesion of the coating to the formed plastic container is difficult and flaking or delamination of such coatings is a significant problem. Accordingly, an improved system for producing plant containers that will control root growth has long been sought.

SUMMARY OF THE INVENTION

The present invention satisfies the above-described needs by providing an improved material from which to make a plant container. The improved material of the present invention comprises a substantially flat sheet of thermoformable plastic having on at least one side thereof a coating composition comprising an acrylic latex emulsion, copper hydroxide, a filler, and a dispersant. The coating composition can be applied to all of a side of the plastic sheet or only to selected portions of the plastic sheet. Optionally, a second layer of the coating composition can be applied to all of a side of the plastic sheet or only to selected portions of the plastic sheet. The coated plastic sheet can then be used in a conventional forming process to form the sheet into a desired size and shape for a plant container.

The method of the present invention for making a plant container comprises the steps of applying to a substantially flat sheet of thermoformable plastic an aqueous coating composition comprising an acrylic latex emulsion, copper hydroxide, a filler, and an acrylate dispersant. The coating composition can be applied to all of a side of the plastic sheet or only to selected portions of the plastic sheet. Optionally, a second layer of the coating composition can be applied to all of a side of the plastic sheet or only to selected portions of the plastic sheet. The coating composition is dried. The coated plastic sheet is heated to a temperature sufficient to form the plastic. Then, the coated and heated plastic sheet is formed into a desired shape.

Accordingly, an object of the present invention is to provide for improved control of plant root growth in plant containers.

Another object of the present invention is to provide an improved composition from which plant containers can be made.

A further object of the present invention is to provide a method of producing plant containers by which a root growth controlling coating is applied to a plastic sheet prior to fabrication into a plant container.

Yet another object of the present invention is to provide a composition for coating thermoformable plastic sheet material which has improved properties of crack resistance and adherence during and after thermoforming of the plastic sheet.

Another object of the present invention is to provide an improved plant growing container, especially a plant propagation tray.

Still another object of the present invention is to provide an improved method of applying a root growth controlling coating to a plant container.

These and other objects, features and advantages of the present invention will become apparent after a review of the following detailed description of the disclosed embodiments and the appended claims.

DETAILED DESCRIPTION OF THE DISCLOSED EMBODIMENTS

The present invention relates to containers for plants, such as plant propagation trays, flower pots and the like, made from molded sheets of plastic. The present invention provides a root growth inhibiting coating composition which can be applied to the plastic sheet before it is molded into a desired shape for a plant container.

The root growth inhibiting coating composition of the present invention comprises copper hydroxide, an acrylic latex, an acrylate dispersant and a filler. The coating composition is applied to at least one side of a sheet of plastic and then dried. Optionally, one or more additional layers of the coating composition can be applied to at least one side of the sheet of plastic. If desired, the coating composition can be applied to both sides of the sheet of plastic. The coated sheet of plastic is heated to a temperature sufficient to form the sheet into a desired plant container shape. Then, the heated, coated sheet is placed in a mold and molded to the desired shape, such that the coated side of the sheet faces the root-containing portion of the plant container.

The coating composition of the present invention includes copper hydroxide as its source of $Cu^{+2}$ ions. The cupric ions from the composition of the present invention are adsorbed onto ion adsorption sites of plant roots and stop growth short of the container walls. Although other sources of $Cu^{+2}$ ions, such as copper carbonate, have been used in root growth compositions in the past, it has been 1.5 found as a part of the present invention that only copper hydroxide is useful in the present invention as a source of $Cu^{+2}$ ions. Furthermore, the amount of copper hydroxide which is used in the coating composition of the present invention is critical. The amount of copper hydroxide which is useful in the present invention is between approximately 8 percent and 30 percent by weight of the composition.

The coating composition of the present invention also includes an acrylic latex emulsion. However, not all acrylic latexes are useful in the present invention. The acrylic latexes which can be used in the present invention are characterized by having thermal stability, ability to be substantially stretched on heating to the softening point of the plastic substrate and good adherence to the substrate during and after thermoforming. In order to determine what acrylic latex emulsions will work in the present invention, a simple test can be performed. The acrylic latex can be formulated with water and copper hydroxide in accordance with the present invention, applied to a sheet of thermoformable plastic and dried. If after the plastic sheet is thermoformed the composition delaminates from more than 10% of the surface area of the plastic which was coated with the coating composition of the present invention, the acrylic latex is unacceptable. If the acrylic latex emulsion passes the foregoing test, it is defined herein as being a non-delaminating acrylic latex.

The amount of the acrylic latex which is used in the coating composition of the present invention is critical. The amount of acrylic latex which is useful in the present invention is between approximately 20 percent and 45 percent by weight of the composition.

The coating composition of the present invention also includes a dispersant for enhancing shelf life of the composition by stabilizing the dispersion of solids in the composition. Suitable dispersants include polyelectrolytes, lignin sulfonates, and naphthalene derivatives, or the like. A particularly preferred dispersant is an acrylate dispersant. In the coating composition of the present invention, the dispersant is present in an amount between approximately 1 and 6 percent by weight.

The coating composition of the present invention also includes a filler which imparts porosity and structure to the resulting dried film. The coating composition must therefore be able to stretch to a size four times its original size without breaking in order to accommodate sharply bent corners and edges which result from the forming process. Suitable fillers are carbonate fillers, such as calcium carbonate and magnesium carbonate. Other suitable fillers may be used including talc, kaolin, or other carbonate or silicate materials. The carbonate filler also acts to buffer the pH of the composition, thus reducing the potential for phytotoxic effects on plants. The filler may also provide micronutrients to plants exposed to the coating. In the coating composition of the present invention, the filler is preferably present in an amount from about 2 percent to about 31 percent by weight of the composition; preferably, between approximately 2% and 20% by weight of the composition. In the dried film, the filler is preferably present in an amount from about 20 percent to about 70 percent by weight of the film.

The coating composition of the present invention may also include a humectant which imparts freeze-thaw stability to the composition and functions as a processing aide or co-solvent. Suitable humectants include propylene glycol, ethylene glycol, and diethylene glycol, and the like. In the composition of the present invention, the humectant is preferably present in an amount up to about 5 percent by weight of the composition.

The coating composition of the present invention may optionally include a surfactant for enhancing the function of the dispersant and lowering the surface tension of the composition, thereby providing improved coverage and tenacity on the plant container surface. The surfactant is also used to modify surface tension to thereby aid in wetting the copper and fillers into the latex. Suitable surfactants include phosphate esters, block copolymers, sulfosuccinates, salts of sulfonated alcohols, ethoxylated alcohols, tetramethyl decyne diol, and the like. A particularly preferred surfactant is tetramethyl decyne diol. In the coating composition of the present invention, the surfactant is present in an amount up to approximately 10 percent, preferably approximately 3 percent, by weight of the composition.

Still further, the coating composition of the present invention may include a thickening agent for increased viscosity and enhanced storage stability. Suitable thickening agents include xanthane gum, polysaccharide gum, cellulose derivatives, polymeric thickeners, and clay, or the like. A preferred thickening agent is Kelzan AR which is available from KELCO of San Diego, Calif. In the coating composition of the present invention, the thickening agent is present in an amount up to approximately 0.4 percent, preferably approximately 0.15 percent, by weight of the composition.

The coating composition of the present invention may further include an antifoam agent to reduce foam generation during manufacture. Suitable antifoam agents includes oils, dimethyl silicone, and tetramethyl decyne diol, or the like. Preferred antifoam agents are Foam Control 78 (a silicon surfactant) which is available from Witco Corp. of Houston, Tex. and Surfynol 104 E (an acetynelic diol) which is available from Air Products and Chemicals, Inc. of Allentown, Pa. In the coating composition of the present invention, the antifoam agent is present in an amount up to approximately 2 percent, preferably approximately 0.3 percent, by weight of the composition.

The coating composition of the present invention may still further include a preservative for extending the shelf life of the product by eliminating spoilage due to microbial degradation. Suitable preservatives include 1,2-benzisothiazolin-3-one, formaldehyde, and the like. In the coating composition of the present invention, the preservative is present in an amount up to approximately 2 percent, preferably approximately 0.1 percent, by weight of the composition.

Yet further still, the coating composition of the present invention may also include other additives such as co-solvents, other pesticidal compounds, or coalescing agents. Suitable co-solvents include methanol, isopropyl alcohol, and the like, which modify drying time by flashing off the water in the composition. In the coating composition of the present invention, the co-solvent is present in an amount up to approximately 10 percent, preferably approximately 3 percent, by weight of the composition. Suitable pesticidal compounds include soil sterilants, insecticides, and systemic fungicides, or the like. In the coating composition of the present invention, the pesticide is present in an amount up to approximately 1 percent, preferably approximately 0.25 percent, by weight of the composition. Suitable coalescing agents include alcohol esters, aminated products, glycols or glycol ethers which also modify the drying time of the composition. In the coating composition of the present invention, the coalescing agent can be present in an amount up to approximately 3 percent, preferably approximately 0.5 percent, by weight of the composition.

Lastly, the coating composition of the present invention can be formulated with up to approximately 40 percent by weight water, preferably between approximately 15 and 41 percent by weight, most preferably approximately 21 percent by weight.

The coating composition of the present invention is applied to at least one side of a substantially flat, i.e., not formed into the shape of a plant container, piece of thermoformable plastic, preferably in sheet form. The plastic is selected from the group of polystyrene, polyethylene, polypropylene and mixtures thereof. Optionally, one or more of those plastics can be formulated with another thermoformable plastic material, such as would be encountered in recycled plastics. The thickness of the plastic sheet is that thickness which can be formed by conventional thermoforming methods to form plant containers, preferably between approximately 10 and 60 mils thick.

The coating composition is applied to the sheet of plastic by any suitable method for forming a relatively thin coating on sheet material, such as by roll coating, kiss coating, curtain coating, brushing, dipping and spraying. A particularly preferred method of applying the coating composition to at least one side of the sheet of plastic is by printing. Printing techniques Which are useful in the present invention include, but are not limited to, rotogravure, flexopress, offset, letterpress and silk-screening. The foregoing printing techniques for applying various liquid compositions to plastic sheets are well known to those skilled in the art. Printing techniques which are useful in the present invention are disclosed in U.S. Pat. No. 4,576,801 the disclosure of which is incorporated herein by reference.

The coating composition of the present invention can be applied on the entirety of at least one side of the plastic sheet, or it can be applied only to selected portions of the plastic sheet. The coating composition can be applied to the plastic sheet to form a first layer of the coating composition on the plastic sheet. Optionally, a second layer of the coating composition can be formed on the plastic sheet. The second layer can be formed by applying the coating composition to the entirety of at least one side of the plastic sheet, or it can be applied only to selected portions of the plastic sheet. If desired, additional layers of the coating composition can be formed on at least one side of the plastic sheet.

The amount of the coating composition which is useful in the present invention which is applied to the plastic sheet is that amount of the coating composition which will provide between approximately 100 and 1,200 mg copper metal equivalent per $cm^2$ of surface area of the plastic sheet prior to thermoforming; preferably between approximately 600 and 1,000 mg copper metal equivalent per cm2. After thermoforming, the finished container will have a copper metal equivalent between approximately 100 and 400 mg per $m^2$.

After the layer or layers of the coating composition have been applied to the plastic sheet, the coating composition is dried on the plastic sheet. The coating composition can be dried by exposure to ambient conditions or the coating composition can be dried at elevated temperatures in an oven, such as at temperatures between approximately 30° and 120° C., or equal to or greater than the softening point temperature of the plastic. After the coating composition on the plastic has been dried, the plastic can be stored for later forming processes or it can proceed directly to the molding process.

In order to mold the coated plastic, it must be heated to at least the temperature of the softening point of the particular plastic being used. If the plastic is polystyrene, the coated polystyrene plastic should be heated to a temperature of between approximately 100° and 140° C., preferably approximately 110° C. If the plastic is polyethylene, the coated polyethylene plastic should be heated to a temperature of between approximately 120° and 140° C., preferably approximately 130° C. If the plastic is polypropylene, the coated polypropylene plastic should be heated to a temperature of between approximately 120° and 140° C., preferably approximately 130° C.

Mixtures of thermoformable plastics can also be used, for example, recycled or waste plastic. In that case the temperature is adjusted to the softening point of the particular plastic used.

If the coating composition on the plastic is dried at a temperature below the softening point temperature or if the plastic is stored after drying of the coating composition, the temperature, of the plastic must be raised to at least the softening point temperature prior to thermoforming. If the coating is dried at the softening point temperature or above, the plastic does not require any additional heating and can proceed directly to the molding process. Heating of the plastic to the softening point temperature can be achieved by any conventional means, such as by the use of a forced air oven or by radiant heat.

With the coated plastic sheet at or above its softening point temperature, the heated plastic is subjected to a conventional molding process, such as vacuum molding, blow molding, etc., in order to form the sheet into the desired shape of a plant container, such as a plant propagation tray or a flower pot. In order to facilitate removal of containers from the mold or for denesting of stacked containers, a conventional mold release composition can be applied to the coated plastic sheet prior to insertion in the molding apparatus, but after the coating composition has been dried on the plastic sheet. Conventional mold release compositions include Dow Corning release 490, DC 36 emulsion and Michaelmen's wax slip aids.

The coated sheet of plastic is oriented in the molding apparatus in such a manner that when the sheet is formed into the desired plant container shape, the coated surface of the sheet faces the portion of the plant container which holds the root portion of the plant. After the molding process, the formed plaint container is removed from the molding apparatus and is ready to use.

A plant can then be planted in the plant container. As the roots grow outwardly toward the coated interior walls of the plant container, the growth of the roots immediately adjacent the walls is controlled. Thus, when it is desired to remove the plant from the plant container, the plant is easily removed therefrom with little or no damage to the existing plant root system. This ease of removal of the plant from the plant container of the present invention makes plant transplantation significantly easier than with conventional plant containers. Furthermore, the ability to coat a sheet of plastic with the coating composition of the present invention before it is formed into a plant container is relatively easier, inexpensive and requires less labor than with conventional systems of applying a root growth control composition to the interior of a formed plant container.

The following examples are illustrative of the present invention and are not intended to limit the scope of the invention as set forth in the appended claims. All temperatures are in degrees Celsius and all percentages are by weight unless specifically stated otherwise.

EXAMPLE 1

A coating composition is prepared having the following constituents:

| Ingredient | Weight % |
| --- | --- |
| Propylene Glycol | 2.0 |
| Water | 20.75 |
| Colloid 255 | 2.0 |
| Proxel GXL | 0.1 |
| Mapico Black | 3.0 |
| Huber Carb Q | 6.0 |
| Magnesite 33 | 2.0 |
| Spin Out FP | 23.0* |
| Ucar 651 | 40.0 |
| Kelzan AR | 0.15 |
| Surfonyl SEF | 1.0 |

*13.2% copper metal equivalent.

Colloid 255 is a sodium polyacrylate and is available from Rhone Poulenc of Cranbury, N.J. Proxel GXL is a preservative available from ICI Chemical of Wilmington, Del. Mapico Black is a black iron oxide available from Columbian Chemicals Company of Atlanta, Ga. Huber Carb Q is a calcium carbonate filler and is available from JM Huber Corp., of St. Louis, Mo. Magnesite 33 is a magnesium carbonate filler and is available from Premier Service Corp. of King of Prussia, Pa. Spin Out FP is an 88% copper hydroxide product and is available from Griffin Corporation, of Valdosta, Ga. Ucar 651 is an acrylic latex binder agent having a solid content of about 47% by weight, and is available from Union Carbide of Danbury, Conn. Kelzan AR is a thickening agent comprising a polysaccharide and is available from KELCO of San Diego, Calif. Surfonyl SEF is a proprietary surfactant blend available from Air Products and Chemicals, Inc. of Allentown, Pa.

The composition is prepared by combining with water, the acrylate dispersant (Colloid 255) and the preservative (Proxel GXL). The copper hydroxide (Spin Out FP) and fillers (Huber Carb Q and Magnesite 33) are blended into the foregoing mixture with a Cowles mixer to a fineness of grind of approximately 2 to 4 microns. The grinding process takes approximately 30 minutes. The acrylic latex (Ucar 651) is then added at a slow mixing speed. The other additives are then added. Mixing is continued until the composition is uniformly mixed.

A sheet of polystyrene plastic having a thickness of 15–60 mils is then sprayed with a coating of the above-described composition. The composition is applied to the plastic sheet at a rate such that approximately 800 mg copper metal equivalent per cm2 is applied to the surface of the plastic. The coated plastic sheet is then placed in a forced air oven at a temperature of approximately 110° to 120° C. for an appropriate time to dry the coating, normally less than 20 seconds. The drying of the coating also heats the plastic to a temperature equal to or slightly above its softening point.

The coated plastic sheet is then removed from the oven and is placed in a vacuum forming-type mold for forming into the desired shape, i.e., a plant propagation tray. Prior to placing the coated plastic in the mold, it is sprayed with a mold release composition, such as, Dow Corning release 490, DC 36 emulsion and Michaelmen's wax slip aids. These coatings not only function as mold release agents but also prevent the formed plant propagation trays from sticking to each other when they are stacked together.

The formed plant propagation tray is removed from the mold after forming. Inspection of the formed trays reveals that the coating thereon his good adhesion to the plastic surface and is substantially continuous, i.e., substantially free of cracks, even at sharply bent corners and edges.

EXAMPLE 2

A coating composition is prepared as in Example 1 except that the composition has the following constituents and quantities:

| Ingredient | Weight % |
| --- | --- |
| Ucar 651 | 20 |
| Water | 30 |
| Spin Out FP | 9 |
| Colloid 255 | 3 |
| Huber Carb Q | 23 |
| Magnesite 33 | 15 |

The coating composition is applied to a sheet of polystyrene plastic which is then formed into a plant container in the same manner as described in Example 1.

After removal of the plant container from the mold, it is inspected. Inspection of the formed container reveals that the coating thereon has good adhesion to the plastic surface and is substantially continuous, i.e., substantially free of cracks, even at sharply bent corners and edges.

EXAMPLE 3

Six different coating compositions were prepared, applied to polystyrene plastic sheets and molded in a manner as described in Example 1, except that different acrylic latexes were used to prepare the different coating compositions. The different latexes are listed below:

| Latex | Thermoformable |
|---|---|
| Ucar 651 | Yes |
| Ucar 625 | Yes |
| Ucar 413 | Yes |
| Ucar 123 | No |
| Ucar 535 | No |
| Ucar 173 | No |

The above Ucar products are all acrylic latexes available from the Union Carbide of Danbury, Conn. The latexes differ in hardness and stretch capability.

Inspection of the molded plant containers reveals that the containers coated with compositions containing Ucar 651, 625 and 413 demonstrated good coating adhesion to the plastic surface and was substantially continuous, i.e., substantially free of cracks, even at sharply bent corners and edges. Those containers coated with compositions containing Ucar 123, 535 and 173 demonstrated unacceptable coating adhesion to the plastic surface and was discontinuous, i.e., unacceptable cracking of the coating at bent corners and edges.

EXAMPLE 4

Two coating compositions were prepared as shown below. Formulation A contained, as its source of copper$^{+2}$ ions, copper hydroxide; whereas, Formulation B contained, as its source of copper$^{+2}$ ions, copper carbonate. The two formulations contained the following ingredients.

| Ingredient | Formulation A | Formulation B |
|---|---|---|
| Water | 14.6 | 14.6 |
| Propylene glycol | 2.0 | 2.0 |
| Proxel GXL | 0.1 | 0.1 |
| Colloid 255 | 2.0 | 2.0 |
| Copper hydroxide | 26.1 | 0 |
| Copper carbonate | 0 | 26.1 |
| Calcium carbonate | 5.0 | 5.0 |
| Magnesium carbonate | 2.0 | 2.0 |
| Ucar 651 | 47.5 | 47.5 |
| Surfonyl 440 | 0.5 | 0.5 |
| Kelzan AR | 0.1 | 0.1 |
| Foam Control 1378 | 0.1 | 0.1 |

Formulations A and B shown above were applied by spraying to a sheet of 30 mils thick polystyrene plastic to form a coating thereon. The coated plastic sheet was then placed in an over at approximately 140° C. for 10 minutes. While the plastic was still hot, i.e., at a temperature above its softening point, it was shaped in the form of a flower pot with a volume of 2 liters.

Spider plants (*Chlorophytum comosum*) were planted in each pot to determine the extent of the root control for each of the two different formulations. After 30 days, the plants were removed from the pots and evaluated for degree of root control. The pots made from the material coated with the copper carbonate formulation, i.e., Formulation B, provided no control of root growth. The pots made from the material coated with the copper hydroxide formulation, i.e., Formulation A, provided excellent control of root growth. The same results were found when the pots were evaluated after the plants had been growing for a period of 4 months.

This result was unexpected because copper carbonate has better heat stability than copper hydroxide. Furthermore, copper carbonate formulated in conventional latex paint provides root control for trees and shrubs. Spider plants are herbaceous and are very sensitive to copper root control coatings compared to woody trees and shrubs. Therefore, a coating containing copper carbonate was expected to provide root control in the present invention. However, as shown above, copper carbonate is not suitable for use in the present invention.

EXAMPLE 5

The coating composition of Example 1 is applied to a sheet of polyethylene having a thickness of 60 mils. The composition is applied to the plastic sheet at a rate such that approximately 800 mg copper metal equivalent per cm2 is applied to the surface of the plastic. Prior to applying the coating to the plastic sheet, the surface of the plastic sheet is exposed to a corona discharge treatment to provide better adhesion of the coating to the plastic.

The coated plastic sheet is fed through a forced air oven at a temperature of approximately 130° C. for a period of approximately 15–20 seconds to dry the coating on the plastic. The drying of the coating also heats the plastic to a temperature equal to or above its softening point.

The coated plastic sheet is then fed into a vacuum forming-type mold for forming into the desired shape, i.e., a plant propagation tray. The formed plant propagation tray is removed from the mold after forming. Inspection of the formed trays reveals that the coating thereon has good adhesion to the plastic surface and is substantially continuous, i.e., substantially free of cracks, even at sharply bent corners and edges.

EXAMPLE 6

A coating composition is prepared as in Example 1 except that the composition has the following constituents and quantities:

| Ingredient | Weight % |
|---|---|
| Ucar 651 | 20 |
| Water | 32 |
| Spin Out FP | 9 |
| Gafac RS-610 | 3 |
| Barden Clay | 38 |

Gafac RS-610 phosphate ester surfactant available from Rhone Poulenc of Cranbury, N.J. Barden Clay is a kaolin clay from JM Huber Corp., of St. Louis, Mo.

The coating composition is applied to a sheet of polystyrene plastic which is then formed into a plant container in the same manner as described in Example 1.

After removal of the plant container from the mold, it is inspected. Inspection of the formed container reveals that the coating thereon has good adhesion to the plastic surface and is substantially continuous, i.e., substantially free of cracks, even at sharply bent corners and edges.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method of making a plant container having a copper-containing, non-delaminating layer comprising the steps of:
applying to all or to a selected portion of a substantially flat sheet of thermoformable plastic a first layer of an aqueous coating composition comprising:
approximately 20%–45% by weight non-delaminating acrylic latex, wherein the acrylic latex has thermal stability, the ability to be substantially stretched on heating to the softening point of the thermoformable plastic, and good adherence to the thermoformable plastic during and after thermoforming;
approximately 8%–30% by weight copper hydroxide;
approximately 2%–31% by weight filler; and
approximately 0.5%–5% by weight dispersant;
approximately 15%–41% by weight water;
drying the coating composition on said plastic sheet;
heating the coated plastic sheet to a temperature sufficient to soften said plastic sheet; and
forming the coated and heated plastic sheet into a desired shape, such that said coated portion of the plastic sheet faces the portion of the plant container which holds the root portion of a plant.

2. The method of claim 1, wherein said thermoformable plastic is selected from polystyrene, polyethylene, polypropylene and mixtures thereof.

3. The method of claim 1, wherein said thermoformable plastic is polystyrene.

4. The method of claim 1, wherein said coating composition comprises:
approximately 30% by weight non-delaminating acrylic latex;
approximately 8% by weight copper hydroxide;
approximately 31% by weight filler;
approximately 3% by weight dispersant; and
approximately 28% by weight water.

5. The method of claim 1, wherein said first layer of said coating composition is applied to said plastic sheet by a process selected from spraying, brushing, dipping, roll coating, kiss coating, printing, and curtain coating.

6. The method of claim 1, wherein said first layer of said coating composition is applied to said plastic sheet by a printing process selected from rotogravure, flexopress, offset, letterpress and silk-screening.

7. The method of claim 1, wherein said first layer of said coating composition is applied to said plastic sheet at a rate of approximately 25–800 mg (copper metal equivalent) per $cm^2$ of plastic sheet surface.

8. The method of claim 1, wherein said first layer of said coating composition is applied to said plastic sheet at a rate of approximately 100–400 mg (copper metal equivalent) per $cm^2$ of plastic sheet surface.

9. The method of claim 1, wherein said thermoformable plastic is selected from polyethylene, polypropylene, and polystyrene and further comprising the step of subjecting said plastic sheet to a corona treatment before applying said first layer of said coating composition thereto.

10. The method of claim 1, wherein said coated plastic sheet is heated to a temperature equal to or above the softening point of said plastic sheet.

11. The method of claim 1, wherein said coated plastic sheet is heated to a temperature of approximately 110°–140° C.

12. The method of claim 1, wherein said first layer of said coating composition is applied to selected portions of said at least one side of said plastic sheet.

13. The method of claim 12 further comprising the step of applying a second layer of said coating composition to selected portions of said at least one side of said plastic sheet.

14. A method of making a plant container having a copper-containing, non-delaminating layer comprising the steps of:
applying to all or to a selected portion of a substantially flat sheet of thermoformable plastic an aqueous coating composition comprising:
approximately 20%–45% by weight non-delaminating acrylic latex, wherein the acrylic latex has thermal stability, the ability to be substantially stretched on heating to the softening point of the thermoformable plastic, and good adherence to the thermoformable plastic during and after thermoforming;
approximately 8%–30% by weight copper hydroxide;
approximately 2%–10% by weight filler;
approximately 0.5%–5% by weight dispersant;
approximately 15%–41% water;
approximately 0%–5% by weight propylene glycol; and
approximately 2%–5% by weight iron oxide;
drying the coating composition on said plastic sheet;
heating the coated plastic sheet to a temperature sufficient to form said plastic sheet; and
forming the coated and heated plastic sheet into a desired shape, such that said coated portion of the plastic sheet faces the portion of the plant container which holds the root portion of a plant.

15. The method of claim 14, wherein said coating composition comprises:
approximately 40% by weight non-delaminating acrylic latex;
approximately 23% by weight copper hydroxide;
approximately 8% by weight carbonate filler;
approximately 2% by weight acrylate dispersant;
approximately 22% water;
approximately 2% by weight propylene glycol; and
approximately 3% by weight iron oxide.

16. A method of making a plant container having a copper-containing, non-delaminating layer comprising the steps of:
applying to all or to a selected portion of at least one side of a substantially flat sheet of thermoformable plastic a first layer of an aqueous coating composition comprising:
approximately 20%–45% by weight non-delaminating acrylic latex, wherein the acrylic latex has thermal stability, the ability to be substantially stretched on heating to the softening point of the thermoformable plastic, and good adherence to the thermoformable plastic during and after thermoforming;
approximately 8%–30% by weight copper hydroxide;
approximately 30%–70% water;
approximately 2%–20% by weight filler; and
approximately 0.5%–5% by weight dispersant;
applying to selected portions of said at least one side of said substantially flat sheet of thermoformable plastic a second layer of said aqueous coating composition;
drying the coating composition on said plastic sheet;
heating the coated plastic sheet to a temperature sufficient to form said plastic sheet; and
forming the coated and heated plastic sheet into a desired shape, such that said coated portion of the plastic sheet faces the portion of the plant container which holds the root portion of a plant.

* * * * *